United States Patent
Sherer et al.

(10) Patent No.: US 6,449,052 B1
(45) Date of Patent: Sep. 10, 2002

(54) MULTI-PURPOSE IMAGE GENERATOR FOR DRIVING MULTIPLE OUTPUT DEVICES

(75) Inventors: Ron Sherer, Los Angeles; Gregory H. Wong, Torrance; Steven K. Nelson, El Segundo, all of CA (US)

(73) Assignee: Peerless Systems Corporation, El Segundo, CA (US)

( * ) Notice: Subject to any disclaimer, the term of this patent is extended or adjusted under 35 U.S.C. 154(b) by 0 days.

(21) Appl. No.: 09/299,203

(22) Filed: Apr. 23, 1999

(51) Int. Cl.$^7$ .............................................. G06F 13/00
(52) U.S. Cl. ........................ 358/1.13; 358/1.12; 358/1.5
(58) Field of Search .................... 358/1.5, 1.12, 358/1.13, 1.14, 1.15, 1.16; 345/333, 334, 335, 431

(56) References Cited

U.S. PATENT DOCUMENTS

| | | | | |
|---|---|---|---|---|
| 5,754,222 A | * | 5/1998 | Daly et al. .................. | 348/184 |
| 5,859,644 A | * | 1/1999 | Stokes et al. ................ | 345/431 |

* cited by examiner

Primary Examiner—Mark Wallerson
(74) Attorney, Agent, or Firm—Blakely Sokoloff Taylor & Zafman

(57) ABSTRACT

A set of hardware and/or software elements, typically embedded as part of the input or output device, which operate cooperatively to select from a set of personality parameters to enable the outputting of image data created by different sources to different output devices. Included is a method for printing from embedded devices to inkjet and laser printers with a print preview of images to display devices such as LCD or video screens. The invention provides color management and color adjustments along with built-in output device drivers to generate data required to operate different output devices. In this manner, a single imaging subsystem in a source devices can be used to drive a larger number of output devices. Similarly, a single output subsystem in an output device can be used to obtain data from a large number of source devices. The configuration personality parameters are provided in a compact format, yet image and color quality are optimized for each output device.

10 Claims, 5 Drawing Sheets

| Parameter: | Description | Example: Digital Camera driving a 600DPI Inkjet Printer | Example: Digital Camera driving an LCD Display |
|---|---|---|---|
| Input Resolution | Input Pixels array | 640x480 | 640x480 |
| Input format | Colorants (planes) order, number of bits/pixels, packing | RGB, 8 bits/pixel/plane, contiguous bytes | RGB 8 bits/pixel/plane, contiguous bytes |
| Color Intents | User selectable intents such as: perceptual, relative colorimetric, saturation, and absolute colorimetric | Perceptual | Perceptual |
| Color Adjustments | User Selectable entries | None | None |
| Halftoning Method | clustered-dot dithering, error diffusion | Error Diffusion | None |
| Halftoning Parameters | Implementation specific halftoning parameters | | |
| Color Space Conversion Parameters | Color Calibration generated Color Space Conversion Parameters | Inkjet Color Calibration data for selected resolution and paper and intent | LCD Color Calibration data |
| Output Resolution | Output Pixel Array | 3600x2400 (6"x4" print) | 360x240 |
| Output Format | Colorants (planes) order, number of bits/pixels | CMYK 1 bit/pixel/plane | RGB 8 bits/pixel/plane |

Fig. 4

| Parameter: | Description | Example1: Digital Camera driving a 600DPI Inkjet Printer | Example2: Digital Camera driving an LCD Display |
|---|---|---|---|
| Output Device Resolution | Dots Per Inch horizontal, Rasters per inch Horizontal | 600x600 | N/A |
| Output Device Pixel array | Total number of pixels which can be displayed or printed by the output device. | 1800x1200 | 360x240 |
| Output Device number of Planes required | Output device planes | 4 | 3 |
| Output Data format | Planar or chunky | KCMY Planar | RGB chunky |
| Bits per Colorant pixel | | 1 | 8 |
| Direction | Start at Top/Bottom, left/right | Top left | Top left |
| Compression | Compression type if used | RLE | N/A |
| Top Margin | Number of scan lines from top to start of display/printable area | 450 | 0 |
| Left Margin | Number of pixels from left edge to start of display/printable area | 600 | 0 |
| Header | Sequence of instructions for a specific page format sent to an output device | \<esc\> reset<br>\<esc\>top margin,<br>\<esc\> page length<br>\<esc\> start raster mode | N/A |
| Trailer | Control instructions to the output device to finish printing and setting it to a known state. | \<esc\> end raster<br>\<esc\> reset | N/A |
| Line format | Definition of raster data format to be sent to an output device. It defines the sequence of raster data & control required for the output device to perform its function. | Raster order – K,C,M,Y<br>\<esc\>vertical position<br>\<esc\> compression mode 1<br>\<esc\> left margin, pixel data K,<br>\<esc\> left margin, pixel dataC,<br>\<esc\> left margin, pixel dataM,<br>\<esc\> left margin, pixel dataY | N/A |
| Band size | Optimal number of scanlines in a band. Will be used for buffers memory allocation purposes if sufficient system memory is available. | 60 | 240 |

Fig. 5

MULTI-PURPOSE IMAGE GENERATOR FOR DRIVING MULTIPLE OUTPUT DEVICES

FIELD OF THE INVENTION

The present invention relates to the field of image input and image generation devices such as digital cameras and set-top boxes and output devices such as displays, inkjet and laser printers. Specifically, the invention provides a mechanism for generating image data produced by the input device for direct use by the output device, that is, without requiring intermediate processing by a processing device such as a personal computer.

BACKGROUND OF THE INVENTION

Digital cameras are frequently used by consumers and others to take pictures which are stored as digital image data within the camera. In most cases, in order to output stored images, it is necessary to connect the camera to a personal computer and download the image into the computer where certain processing takes place to prepare the image for printing a hard copy using an ink jet or laser printer. The personal computer is needed because currently available consumer digital apparatus such as digital cameras do not have the capability to send their output directly to commercially available printers, and currently available printers do not have the capability to receive image data to be printed directly from an input device such as a digital camera. Before an image from such an input device can be produced on such an output device, it is necessary to add programming, usually referred to as drivers, to receive the digital data from an input source in an expected format, and then process it to put the data into a form expected by the output device.

Direct camera to printer solutions do exist, but these solutions are directed to systems in which a particular camera is to be connected to a particular printer. Such solutions are usually proprietary in that they use high-end digital cameras and specialty printers such as dye-sublimation. In addition to being expensive, such systems are not capable of connecting a variety of cameras to a variety of printers.

SUMMARY OF THE INVENTION

The present invention enables the use of multiple input sources for connection to multiple output devices without requiring intermediate processing devices. The invention utilizes a set of hardware software elements, embedded as part of the input or output device, which operate cooperatively to select from a set of personality parameters to enable the outputting of image data created by different sources to different output devices. Included is a method for printing from embedded devices to inkjet and laser printers with a print preview of images to display devices such as LCD or video screens. The invention provides color management and color adjustments along with built-in output device drivers to generate data required to operate different output devices.

More specifically, the invention uses a method, primarily for embedded systems, for color image generation and producing device ready pixels for multiple output devices such as displays and printers. Output devices can be selected dynamically via an output device personality parameters set. This embedded image generator is designed to fit in and supports consumer products including digital cameras, DVDs, set-top-boxes, electronic photo storage devices, personal digital assistants, images stored on a network or memory card and photographic kiosk systems. Output devices supported include LCD screens and TV monitors with hardcopy printed on multiple inkjet, laser and dye-sublimation printers. Output devices are also defined via personality parameters, which define specific color quality processing functions appropriate for each device, as well as the specifics of the driving method of each device. The multiple personality parameters are table entries defining a specific output device configuration. This method facilitates support of a large number of output devices from consumer image source devices such as digital cameras.

In this manner, a single imaging subsystem in a source device can be used to drive a larger number of output devices. Similarly, a single output subsystem in an output device can be used to obtain data from a large number of source devices. The configuration personality parameters are provided in a compact format, yet image and color quality are optimized for each output device.

Any supported output device can be dynamically selectable by a user from a suitable input and any supported source device can be dynamically selectable by a user from a suitable output. Multiple display and output devices supported by the same imaging system, can each have varying resolutions, pixel depths color processing and data format and control mechanisms.

BRIEF DESCRIPTION OF THE DRAWINGS

FIG. 4 is a table showing an implementation of imaging and color personality parameters table 19.

FIG. 5 is a table showing an implementation of output device personality parameters table 21.

DETAILED DESCRIPTION OF THE INVENTION

A system and method are disclosed for generating output pixels that are color tuned and optimized for different output devices based upon device characterization parameters in an embedded imaging system.

Figure 1:
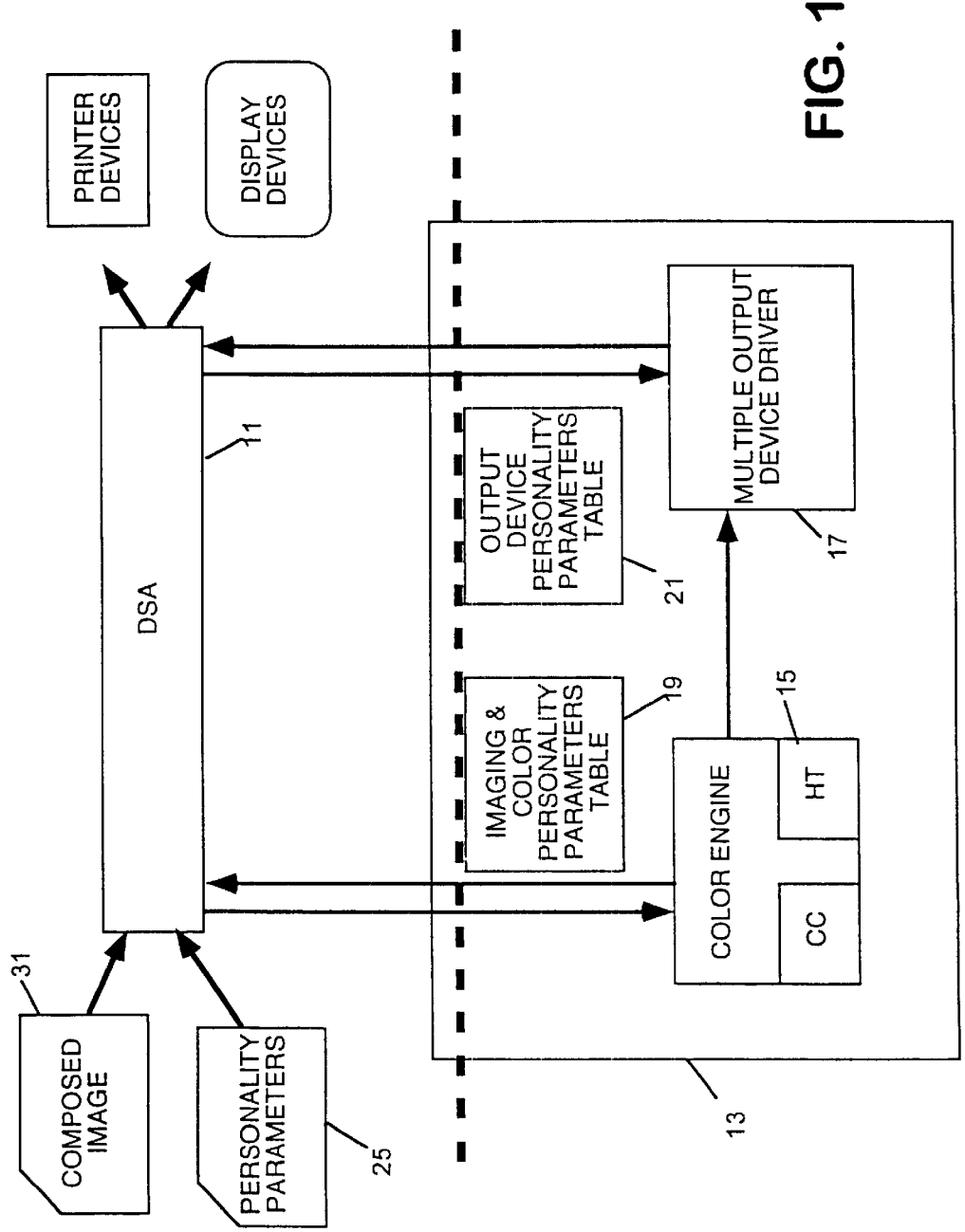
FIG. 1 is a block overview diagram showing the various modules of the invented system.

Referring first to FIG. 1, the invented system uses a device specific application 11 which interfaces with a standard core 13. The core includes a color engine 15, multiple output device driver (MODD) 17, an imaging and color personality parameters table 19 which is used to define all color processing parameters required to support the specific input source and output device configuration in the product and an output device personality parameters table 21 which is used to define the specific characteristic of the data required to be generated in order to display or print on that device. Personality parameters 25 are input to the system used to load or add entries for tables 19 and 21. Updating of those tables enable the system to handle additional input and output devices.

Typically, the above identified elements are implemented as an embedded sub-system within a consumer input/image generation device such as a digital camera or set top box. The input/image generation device (not shown) provides a composed image or images 31 which is presented to device specific application DSA 11 as digital data in a format relatively unique to the input/image generation device.

DSA 11 provides the input/image generation device access to color imaging services. It is responsible to present the composed images to the core 13 and receive the core processing results. That processed data, ready to drive the specified output device, is then transferred to the output device by DSA 11.

Color engine 15 performs color correction and halftoning processing on the image such as:
Transformation of input color space to output color space
Toner response compensation
Contrast, brightness, saturation adjust White/black adaptation
Gray component replacement, under color removal and black generation
Image scaling
Halftoning Such functionality is well known to those skilled in the art and a suitable color engine which may be utilized is described in *Color Technology For Electronic Imaging Devices*, By: Henry R. Kang, Published by: SPIE- The International Society for Optical Engineering, Bellingham, Washington ISBN 0-8194-2108-1.

Figure 2:
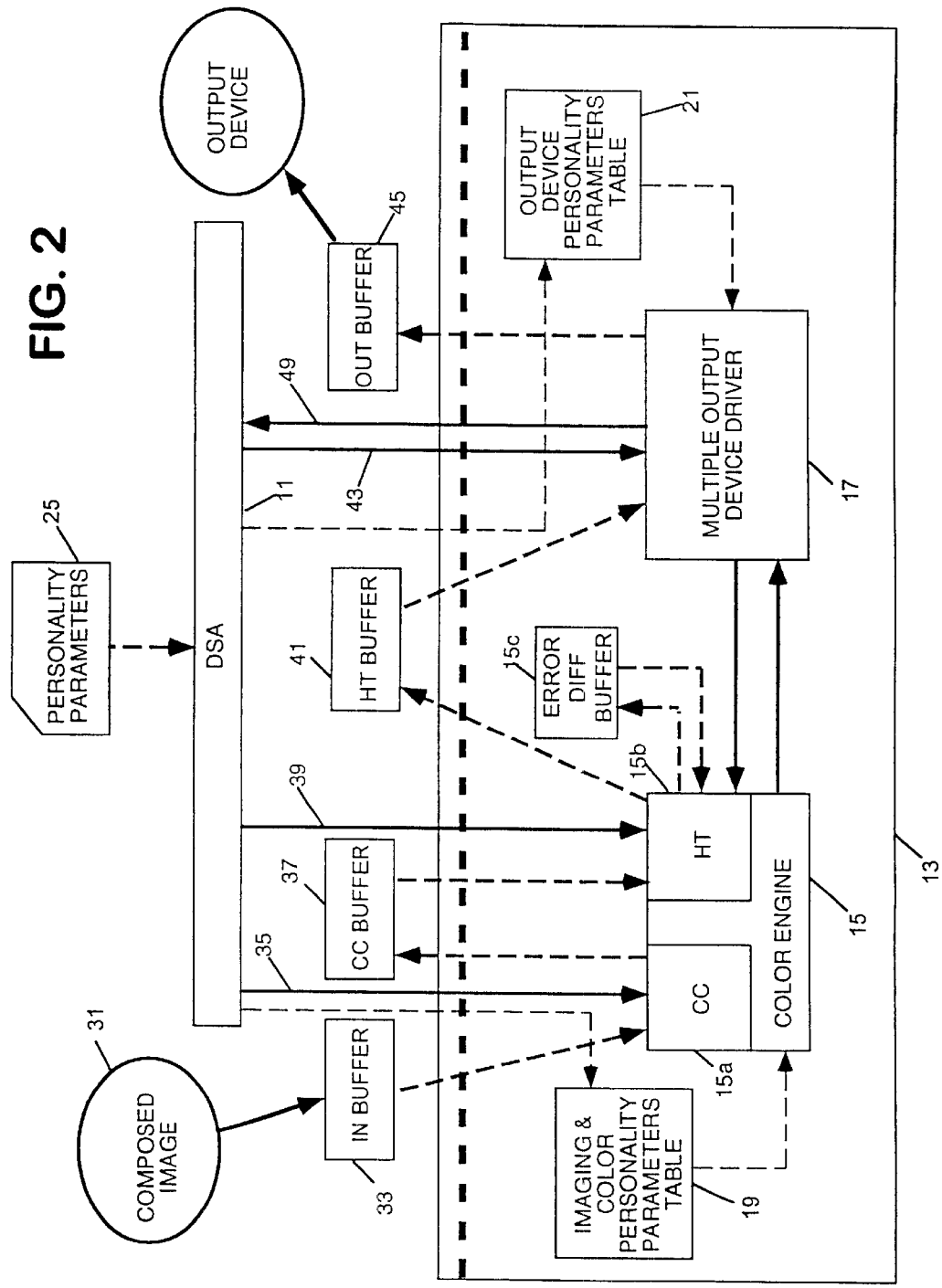
FIG. 2 is a block diagram showing the flow of data and control signals between the modules of the invented system, with data shown in dashed lines and control signals shown in solid lines.

FIG. 2 shows in more detail the functional blocks shown in FIG. 1 and illustrating the flow of data and control signals/calls between the functional blocks.

Composed images 31 are typically stored in the input/image generation device's embedded storage system. To utilize the core functionality, the DSA 11 informs the core 13 of an image ready to be processed by the core along with selected image parameters and output device configuration information. Also, at that time the core is configured to provide any or all of its intendent functions. It can provide color correction only 15a, it can provide halftoning only 15b or it can format data to drive a selected output device only activating MODD 17. It can also provide all those functions by applying the above functions in a serial fashion.

Referring again to FIG. 2, the input data for color correction 15a is provided in the IN buffer 33. Data (i.e., the composed image 31) is loaded into the IN buffer 33 when demanded, for example, using a callback mechanism. More specifically, line 35 represents a return from a color correction callback function indicating that IN buffer 33 has the data to be color corrected. At that time color correction (CC) module 15a will process its data using well known techniques, depositing its results in the CC buffer 37. DSA 11 can now remove that data or use it as input for halftoning (HT) module 15b. To perform a selected halftoning operation, DSA 11 issues a calls represented by line 39 indicating the memory location of the CC buffer 27 and HT buffer 41. The return from call 39 informs the DSA 11 of the completion of the halftoning operation, with the results stored in HT buffer 41 which is typically implemented as a random access memory. When error diffusion halftoning method is selected, the calling function (39) needs to inform the HT module 15b of the memory block assigned for the error diffusion buffer 15c. This buffer 15c is used for interim error diffusion operations and is released once the error diffusion halftoning operation is completed.

Data stored at the HT buffer 41 is at the output device resolution and its corresponding pixel color values. HT buffer 41 is now used as the source for the MODD 17. The MODD 17 functions as a data formatter adding header and trailer data as required by the selected output device. The MODD's output data is stored at the OUT buffer 45 ready to be transferred by the DSA 11 to the specified output device.

MODD 17 is activated with a specific function call 43 which informs that module of the location of its input data located in HT buffer 41, the memory space allocated for the results in OUT buffer 45, and the output device personality parameters table 21. Upon completion of formatting the data according to the selected output device requirements, the MODD 17 will issue a call 49 to the DSA 11, informing the DSA of the data ready to be transferred to the output device from OUT buffer 45. At that time the DSA 11 will transfer the formatted data from the OUT buffer 45 to the selected output device.

Imaging and color personality parameters table 19 defines the values used by the color engine 15 to provide the specific output quality provided by the selected output device. FIG. 4 shows a typical imaging and color personality parameters table 19.

Output device personality parameters table 21 defines the parameters used by the MODD 17 to drive the selected output device. FIG. 5 shows a typical output device personality parameters table 21.

Print a Selected Picture from a Digital Camera to an Attached Inkjet Printer

Figure 3:
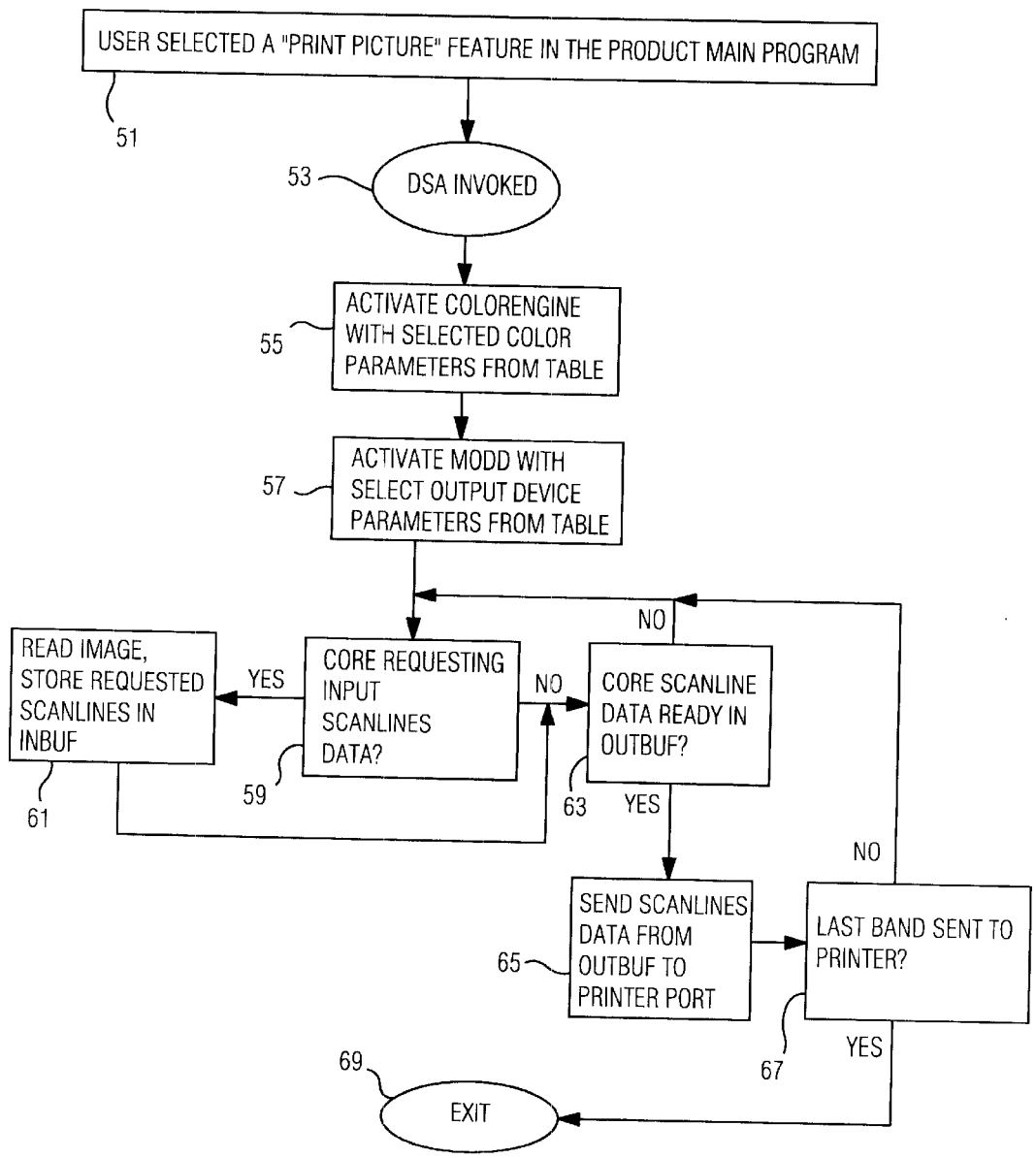
FIG. 3 is a flow diagram showing the operation of a typical device specific application 11.

FIG. 3 illustrates the basic operation of a typical DSA 11 in which DSA 11 is invoked by a program operating within the digital camera following a set of user interaction sequences resulting in the selection of a picture to be printed. When invoked at step 53, DSA 11 is informed by its calling program of the selected output device and color parameters settings. That is, the user causes the program operating in the digital camera to identify the make/model of the camera and the make/model of the printer by selecting from among preprogrammed devices defined in the camera. These preprogrammed devices have personality parameters 25 associated with them. As new devices become available, the preprogrammed information can be updated by, for example, downloading updated information from a Web site. Alternatively, a memory, such as a flash memory card, can be replaced in the camera which contains parameters for devices in addition to those provided initially in the camera.

In step 55, DSA 11 will initialize the color engine 15 to select a single entry from the color parameter table 19. Next, at step 57, the MODD 17 will be configured to drive the user selected printer from the output parameters table 21. At this point the selected picture data is ready to be processed through the core and printed on the attached inkjet printer. That operation is a loop having the following steps. A request for data from the core is received in step 59, image bands are transferred to the IN buffer 33 in step 61. When data to drive the printer is ready in OUT buffer 45 at step 63, that data is sent to the printer port at step 65. That loop repeats at step 67 until the end of page is reached. At that time, the DSA will exit at step 69 notifying the input/image generation device of the results of its operation. The read image operation at step 61 typically involves retrieving the requested scanlines data from the input/image generation device's memory system such as files on a flash cards. The send data to port operation at step 65 typically involves activation of a port driver such as a serial port and sends the data from the OUT buffer 45 to the connected printer.

Display a Selected Picture from a Digital Camera's Memory to its LCD Display

In an alternate use of the invention, DSA 11 is invoked as above, with the intent of displaying to a LCD screen. Step 55 will initialize the color engine to select the color parameter table 19 entry assigned to the LCD display, and step 57 will configure the MODD 17 to select the LCD display device from the output parameters table 21. Steps 59, 61, and 63 perform identical function as detailed above in the printing example, resulting in data ready to drive the LCD display in the OUT buffer 44. Step 65 transfers that data to the LCD display device which typically involves memory to memory data transfer to that device space, or, in some cases, OUT buffer 44 can be mapped to the LCD memory, in which case no operation is performed in step 65. The same exit mechanism is used when driving a display device, a test is performed to detect end of output page generation at step 67 forcing an exit at step 69 at that instance.

Accordingly, a multi-purpose image generator for driving multiple output devices has been disclosed. Although specific embodiments and examples have been set forth, the invention should not be construed as being limited to those specifically disclosed embodiments and examples.

We claim:

1. A system for generating images for a display device originating from a source comprising:

a) sets of imaging and color personality parameters;

b) sets of output device personality parameters;

c) a module adapted for use with a specific source, its inputs including an image to be displayed, said adapted module for coupling to a display device;

d) a color engine coupled to said adapted module which operates to select one of said sets of imaging and color personality parameters and output a color engine processed version of said image;

(e) a multiple output device driver coupled to said color engine and said adapted module which operates to select one of said sets of output device personality parameters and output a device driver processed version of said image for use by said adapted module for outputting to said display device.

2. The system as defined by claim 1 wherein the source is an image stored in a digital camera and said adapted module is a subsystem within said digital camera.

3. The system defined by claim 1 wherein the source is an image stored on a network and said adapted module is a subsystem within said display device.

4. The system defined by claim 1 wherein said display device is at least one of an inkjet printer, an LCD screen and a laser printer.

5. The system defined by claim 1 wherein the source is an image stored in a set top box and said adapted module is a subsystem within said set top box.

6. The system defined by claim 1 wherein said sets of imaging and color personality parameters are stored as a table within a subsystem including said color engine and said multiple output device driver.

7. The system defined by claim 6 wherein said table is dynamically updatable based on data received from said adapted module.

8. The system defined by claim 1 wherein said sets of output device personality parameters are stored as a table within a subsystem including said color engine and said multiple output device driver.

9. The system defined by claim 8 wherein said table is dynamically updatable based on data received from said adapted module.

10. A method for generating images on a display device originating from a source using an embedded sub-system, said method comprising the steps of:

a) receiving an image to be displayed b) selecting one from a set of imaging and color personality parameters and using said selected one to output a processed version of said received image;

c) receiving said processed version of said image;

d) selecting one from a set of output device personality parameters and using a selected one to output a further processed version of said image for for outputting to said display device.

* * * * *